(12) United States Patent
Kulkarni et al.

(10) Patent No.: US 11,449,403 B2
(45) Date of Patent: Sep. 20, 2022

(54) APPARATUS AND METHOD FOR DIAGNOSING FAULTS IN A FIELDBUS INTERFACE MODULE

(71) Applicant: Honeywell International Inc., Morris Plains, NJ (US)

(72) Inventors: Amit Kulkarni, Hyderabad (IN); Ganesh Ratilal Patil, Hyderabad (IN); Mohammed Rizwan, Bengaluru (IN); Vimal Kant, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 477 days.

(21) Appl. No.: 16/597,516

(22) Filed: Oct. 9, 2019

(65) Prior Publication Data

US 2021/0109828 A1    Apr. 15, 2021

(51) Int. Cl.
*G06F 11/22* (2006.01)
*G06F 13/40* (2006.01)
(Continued)

(52) U.S. Cl.
CPC ........ *G06F 11/221* (2013.01); *G06F 11/3027* (2013.01); *G06F 11/349* (2013.01); *G06F 13/4063* (2013.01)

(58) Field of Classification Search
CPC .. G06F 11/221; G06F 11/3027; G06F 11/349; G06F 13/4063
See application file for complete search history.

(56) References Cited

U.S. PATENT DOCUMENTS 5,136,498 A * 8/1992 McLaughlin ....... G06F 11/2017
714/11
6,742,136 B2 * 5/2004 Christensen ........ G06F 11/2005
714/E11.078
(Continued)

FOREIGN PATENT DOCUMENTS

EP         0478291 A2 * 4/1992    ............... G06F 11/20
WO    WO-8912345 A  * 12/1989    ............... H02H 3/00
(Continued)

OTHER PUBLICATIONS

G. Bontempo et al., "IC for interbus loop system," Proceedings of the 24th European Solid-State Circuits Conference, 1998, pp. 232-235 (Year: 1998).*

(Continued)

*Primary Examiner* — Bryce P Bonzo
*Assistant Examiner* — Indranil Chowdhury
(74) *Attorney, Agent, or Firm* — Paschall & Associates, LLC; James C. Paschall

(57) ABSTRACT

A method and system for detecting faults in a communication interface is disclosed. The communication interface is connected to a field device and a device bus comprising generating periodic diagnostic pulse by a programing unit. The programing unit is communicatively connected to the controller and a controller interface and provides the diagnostic pulse to a multiplexer to periodically apply the diagnostic pulses from the programming unit to a first winding of a transformer. The programming unit provides the diagnostic pulse to the isolation unit. A sensing unit senses a voltage drop across a sense resistor, the sensing unit having an input connected to the sense resistor and an output connected to the programming unit. The sensing unit communicates a sense signal based on the comparison to the (Continued)

programming unit, and switches from a primary or a secondary module to the other based on the sense signal.

20 Claims, 4 Drawing Sheets

(51) Int. Cl.
*G06F 11/34* (2006.01)
*G06F 11/30* (2006.01)

(56) References Cited

U.S. PATENT DOCUMENTS

| | | | | |
|---|---|---|---|---|
| 7,930,042 B2* | 4/2011 | El-Sayed | ................. | G05B 9/03 |
| | | | | 370/227 |
| 2002/0140433 A1* | 10/2002 | Lawson | ................. | G01R 27/18 |
| | | | | 324/509 |
| 2004/0073912 A1* | 4/2004 | Meza | ................. | G06F 9/4415 |
| | | | | 719/321 |
| 2009/0265057 A1* | 10/2009 | Chinnadurai | ......... | G07C 5/085 |
| | | | | 701/31.4 |
| 2011/0131455 A1* | 6/2011 | Law | ................. | H04L 25/0278 |
| | | | | 714/E11.159 |
| 2011/0161538 A1* | 6/2011 | Decker | .............. | G06F 11/2005 |
| | | | | 710/110 |
| 2013/0201316 A1* | 8/2013 | Binder | .................. | H04L 67/12 |
| | | | | 701/2 |
| 2014/0097691 A1* | 4/2014 | Jackson | .............. | G01R 22/063 |
| | | | | 324/120 |
| 2017/0111212 A1* | 4/2017 | Alam | ................. | H04L 41/0659 |
| 2017/0364424 A1* | 12/2017 | Swanson | ............ | G06F 11/2005 |
| 2017/0365153 A1* | 12/2017 | Sundaresh | ............ | G01R 31/56 |
| 2018/0026809 A1* | 1/2018 | Benson | ................. | H04B 3/548 |
| | | | | 370/311 |
| 2018/0372788 A1* | 12/2018 | Beeram | .................... | G01K 7/20 |
| 2020/0412231 A1* | 12/2020 | Khamesra | ........... | H02H 1/0007 |
| 2021/0089418 A1* | 3/2021 | Das Sharma | .......... | H04L 1/242 |
| 2021/0109586 A1* | 4/2021 | Jenne | ................. | G06F 11/0742 |

FOREIGN PATENT DOCUMENTS

| | | | | |
|---|---|---|---|---|
| WO | 2011082131 A1 | 7/2011 | | |
| WO | WO-2011082131 A1 * | 7/2011 | .......... | G06F 11/2005 |
| WO | WO-2011113948 A1 * | 9/2011 | ......... | H05B 33/0815 |

OTHER PUBLICATIONS

A. V. Scotland W. J. Buchanan, "Truly distributed control systems using fieldbus technology," Proceedings Seventh IEEE International Conference and Workshop on the Engineering of Computer-Based Systems (ECBS 2000), 2000, pp. 165-173 (Year: 2000).*

* cited by examiner

APPARATUS AND METHOD FOR DIAGNOSING FAULTS IN A FIELDBUS INTERFACE MODULE

FIELD

The present disclosure relates generally to industrial process control and automation systems. More specifically, this disclosure relates to the diagnosis of faults in the fieldbus interface module of a process control system.

BACKGROUND

In an industrial process control system, an interface module is incorporated to communicate between the control system and plurality of field devices. Interface modules communicate in different protocols. Different protocols are suitable for different purposes. Protocols are widely used for industrial process control and automation, such as to interconnect sensors, actuators, and input/output (I/O) of controllers in an industrial facility. Different protocol systems are often deployed as digital I/O networks for proprietary controllers. This protocol enables two-way communication between field devices and the control system. One such protocol used for communication in an industrial control system is Foundation Fieldbus. Interface modules used in the Foundation Fieldbus protocol are generally known as fieldbus interface modules (FIM). The FIM integrates the Foundation Fieldbus to the field devices connected with a control system. In some instances, these interface modules can become faulty and fail to communicate in the desired manner. There may be various reasons for faults originating at the FIM including faulty internal hardware or external factors such as connectors, cables or terminations. Loss of control of field devices is an important concern in a Foundation Fieldbus system design. An important area where loss of control occurs is in the redundancy function of a FIM.

FIMs are typically implemented in redundant pairs. In redundant pair configuration, one of the FIM performs the functions as a primary FIM and the other functions as the secondary. In this redundancy configuration, the primary and the secondary FIM work in sync. The primary FIM is responsible to communicate the instructions from the control system to the field devices. The secondary FIM is disposed to take charge of the communication in the field link between the control system and the field devices if the primary FIM fails. Accordingly, it becomes imperative to ascertain any potential fault in a FIM in order to trigger the changeover to its redundant partner. However, in existing FIMs, it is difficult to differentiate between hardware failures in the FIM from failures induces by noise on the field link. Thus, it becomes difficult to ascertain the actual origin of the fault.

Therefore, there arises a need for diagnostics, that can be embedded in the FIM, to determine a FIM hardware fault. This fault detection would ensure seamless and reliable communications between the FIM and the field devices.

SUMMARY

In accordance with an embodiment, the present disclosure relates to an apparatus for detecting faults in a fieldbus interface module. The fieldbus interface module is connected to a field device and a device bus. The interface module comprises, a controller configured to generate a device bus communication signal TXE, and a programming unit communicatively connected to the controller and a controller interface. The programming unit is configured to detect faults in the fieldbus interface module and generate periodic diagnostic pulses. A transformer has a first winding connected to the controller interface and a second winding connected to the device bus. A multiplexer is connected to the programming unit and configured to periodically apply the diagnostic pulses from the programming unit to the first winding of the transformer. An isolation unit is also connected to the programming unit that is configured to periodically apply the diagnostic pulses from the programming unit to the transformer's second winding. A sense resistor is connected in series between the first winding of the transformer and a sensing unit. The sensing unit connects to the programming unit and is arranged to determine the voltage across the sense resistor whereby the sensed voltage is communicated to the programming unit.

BRIEF DESCRIPTION OF THE DRAWINGS

The various embodiments will hereinafter be described in conjunction with the Figures, wherein like numerals denote like elements.

Skilled artisans will appreciate that elements in FIGS. 1-4 are illustrated for simplicity and clarity and have not necessarily been drawn to scale. For example, the dimensions of some of the elements in FIG. 1 may be exaggerated relative to other elements to help to improve understanding of various embodiments of the present disclosure. Also, common but well-understood elements that are useful or necessary in a commercially feasible embodiment may not be depicted in order to facilitate a less obstructed view of these various embodiments of the present disclosure.

DETAILED DESCRIPTION

Various embodiments herein relate to fault detection in interface modules. FIGS. 1 through 4, discussed below, and the various embodiments used to describe the principles of the present disclosure in this patent document are by way of illustration only and should not be construed in any way to limit the scope of the invention. Those skilled in the art will understand that the principles of the invention may be implemented in any type of suitably arranged device or system.

Figure 1:
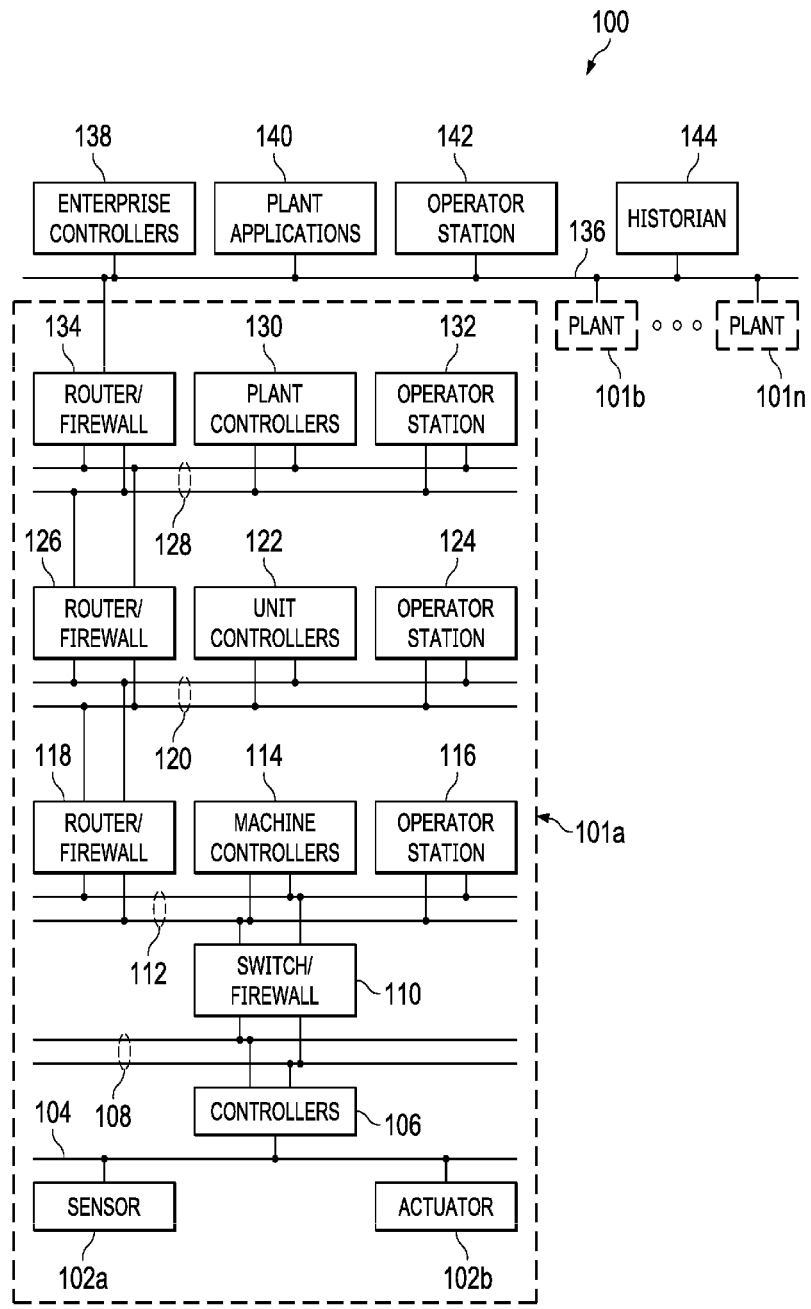
FIG. 1 illustrates an example industrial process control and automation system according to this disclosure.

FIG. 1 illustrates an industrial process control and automation system 100 according to an embodiment of the present disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As a particular example, the network 104 could represent a FOUNDATION FIELDBUS H1 network.

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102 a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102 b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101 a is to be managed, the functionality of the enterprise-level controller 138 could be incorporated into the plant-level controller 130.

Various plant applications 140 could also be executed in the system 100. In this example, the plant applications 140 are shown as residing on Level 5 of the system 100, although plant applications 140 could reside on other or additional levels of the system 100. The plant applications 140 could represent any suitable applications that are executed by server computers or other computing devices.

Access to the enterprise-level controllers 138 and plant applications 140 may be provided by one or more enterprise desktops (also referred to as operator stations) 142. Each of the enterprise desktops 142 includes any suitable structure for supporting user access and control of one or more components in the system 100. Each of the enterprise desktops 142 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 144 can be coupled to the network 136. The historian 144 could represent a component that stores various information about the system 100. The historian 144 could, for instance, store information used during production scheduling and optimization. The historian 144 represents any suitable structure for storing and facilitating retrieval of information. Although shown as a single centralized component coupled to the network 136, the historian 144 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 142 could include one or more processing devices and one or more memories for storing instructions and data used, generated, or collected by the processing device(s). Each of the controllers 106, 114, 122, 130, 138 and each of the operator stations 116, 124, 132, 142 could also include at least one network interface, such as one or more Ethernet interfaces or wireless transceivers, facilitating communication over one or more networks or communication paths.

Various types of technologies are available for linking field devices such as sensors, actuators, and controllers etc. with the field bus. One such type of technology is the foundation field bus network, which is used to interconnect sensors, actuators, and input/output (I/O) of the controllers in an industrial facility.

Figure 2:
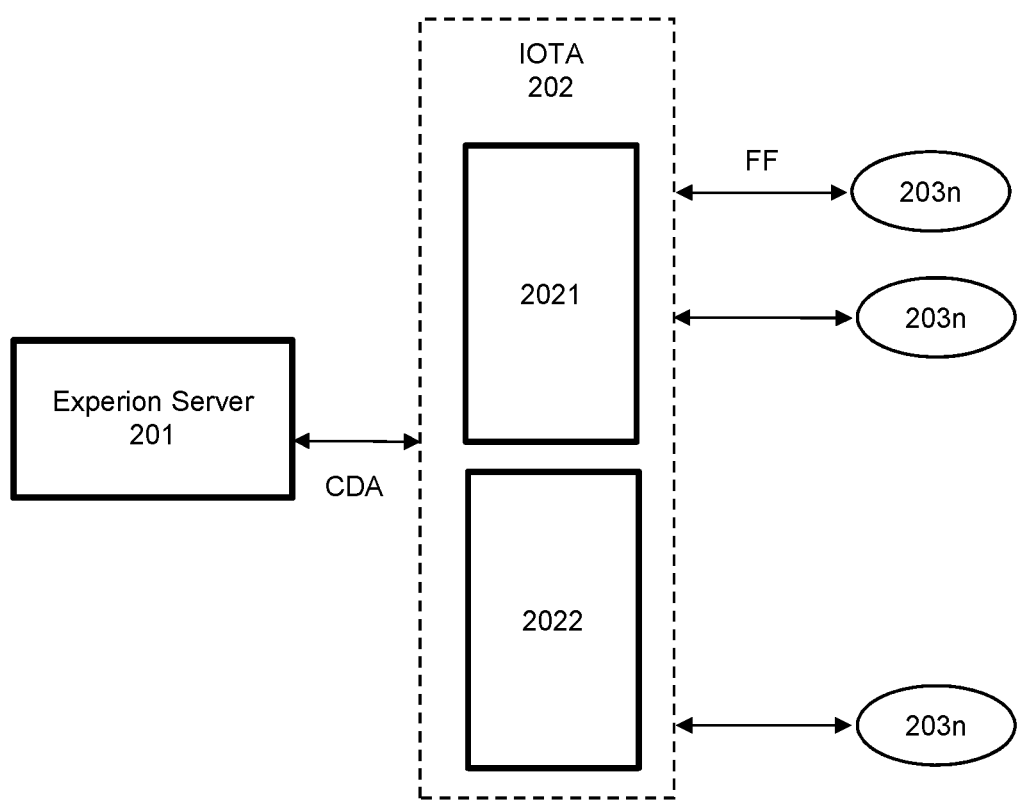
FIG. 2 illustrates an Input Output Terminal Assembly in communication with a control system and field devices.

FIG. 2 illustrates field bus interface modules (FIMs) integrated in an input output terminal assembly (IOTA) and implemented as a redundant pair. The IOTA 202 is connected to a plurality of field devices 203n and a control system 201 as illustrated in FIG. 2. The IOTA 202 includes two independent FIMs, a primary FIM 2021 and a secondary FIM 2022. In a typical configuration, the two FIMs are installed on the IOTA in a redundant configuration, one of the two FIMs functions as primary interface to the field devices 203n and the other functions as a secondary interface. The control system 201 is communicatively connected to IOTA 202 and can preferably be an Automation System Server. The communicative connection between the server 201 and IOTA 202 may be via an ethernet link using a Common Data Access (CDA) protocol.

The plurality of field devices 203n connected to the FIM, include sensors, actuators, valves and can include all technical equipment or hardware used for exercising control in an industrial control and automation system. The IOTA functions as a bridge and communicates commands and instructions from the control system 201 to the field devices 203n.

The two FIMs 2021 and 2022, operate as a redundant pair. Any one of the two FIMs 2021 and 2022 can function as a primary FIM. The primary FIM (in this case 2021) communicates information from Foundation Fieldbus (FF) devices to the server 201 via the CDA protocol. Both FIMs can communicate to the fieldbus devices over a FF communication links. Any one of the FIM may function as the primary FIM when it receives communication from the control system, instructing it to initialize functions as the primary FIM. This communication may come from any higher-order control system or the operator. The secondary FIM 2022 remains on the bus in standby mode and maintains a configuration file that is continuously synchronized with the primary FIM's configuration file. Thus, if the primary FIM 2021 surrenders control, fails, or must be taken offline, the secondary FIM can immediately assume the primary communication link between the FF devices and the control system.

The primary FIM 2021 is in-charge of communication until a failure occurs, in case of any failure, or a switchover is initiated by the control system. An important area where loss of control occurs is at the FIM redundancy switchover. At the time of fault in a primary FIM, the primary FIM 2021 continues to communicate with the server even though secondary FIM 2022 takes over for the field devices. Conventionally, there is a lack of complete control over switching, between a primary FIM 2021 and a secondary FIM 2022. This lack of control over switching may result in abnormal behavior of industrial field devices, affecting the entire industrial process.

If there is a fault in the hardware of the primary FIM 2021, the Primary FIM 2021 continues to communicate with the Experion Server via CDA communication even though secondary FIM 2022 takes over as a link active scheduler (LAS) for the FF devices 203n. This results in live list mismatch and loss of view for the devices connected to the foundation fieldbus (FF) communication links of the FIMs.

Figure 3:
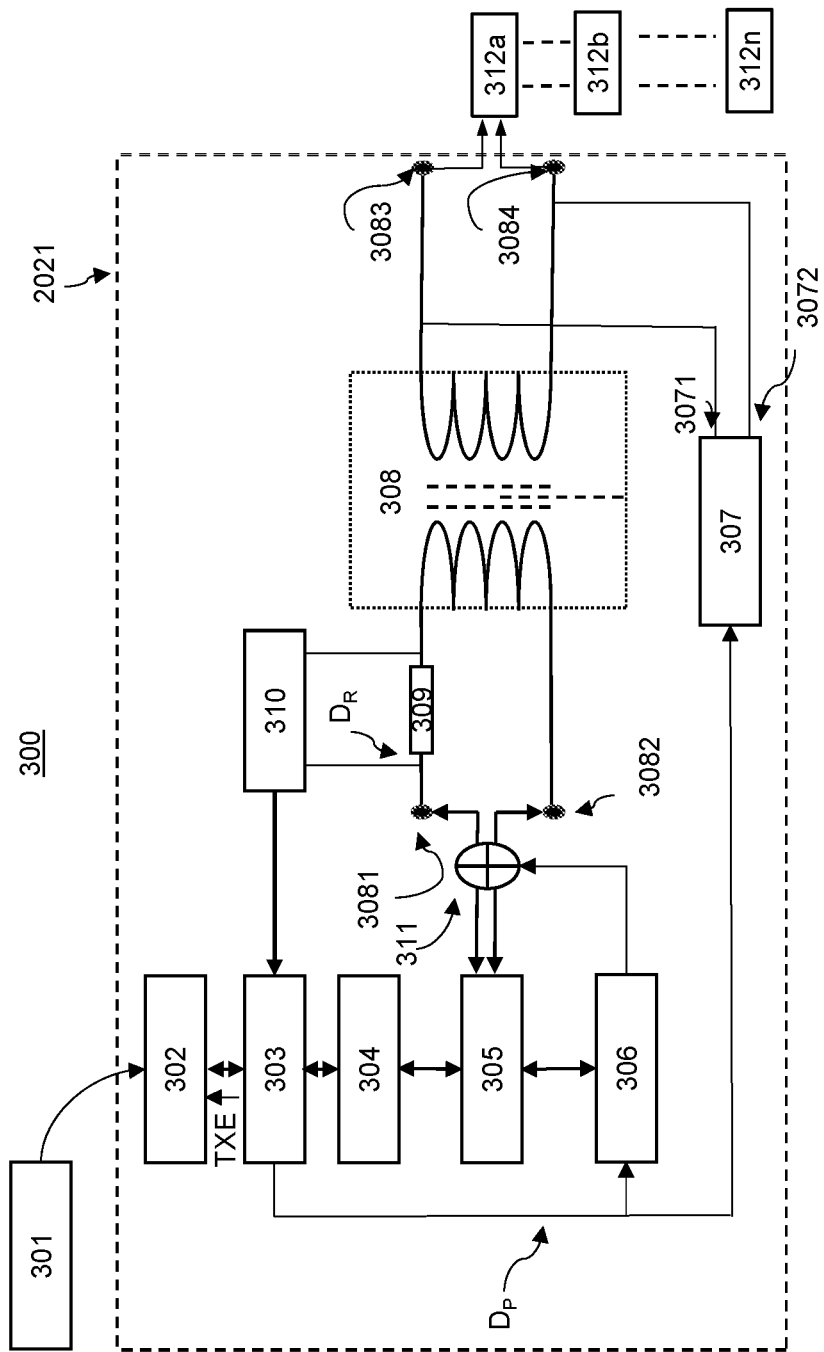
FIG. 3 illustrates a block diagram indicating the components of FIM which take part in the FF (Foundation Fieldbus) communication.

FIG. 3 illustrates the apparatus 300 of the present invention, that provides hardware diagnostics to a FIM to determine hardware faults in an included transformer of the FIM. A control system 301 is connected to a FIM 2021 over an ethernet connection. Although for exemplary function this figure illustrates the FIM 2021, however the same structural components and hardware are present in FIM 2022. The control system 301 performs the communication that provides control over a plurality of industrial equipment and field devices 312n used in the automation system by providing them with specific commands. The FIM 2021 forms an interface between the control system 301 and the field devices 312n. The FIM 2021 is comprised of an ethernet physical layer, a microprocessor 302, a FF controller 304, a media attachment unit MAU 305 and a transformer 308 among other hardware elements. The microprocessor 302 serves as the gateway for communication between the FIM 2021 and the control system 301.

The microprocessor 302 is connected to the control system by the ethernet physical layer. The microprocessor 302 uses an ethernet based stack to communicate with the control system 301 via the ethernet physical layer and a fieldbus stack to communicate with the FF controller 304. The FF controller 304 generates the commands and instructions, required to communicate with the respective field devices 312n. The FF controller 304 receives control data from the microprocessor 301 and generates the desired commands and instruction for the field devices 312n. The output of the FF controller 304 is communicated to the MAU 305. The MAU 305 is implemented as a discrete circuit which performs voltage mode diagnostics and related activities with respect to the signals generated or sent by the FF controller 304. The MAU 305 is connected to transformer 308. The transformer 308 in the FIM 2021, provides link isolation to field devices 312n from the control system 301. There may be several reasons that may cause the FIM 2021 to run into a fault condition, including faults within the hardware of the FIM 2021 and faults external to the FIM 2021. For example, an external fault could be termination or catastrophic severing of the link and its connections. Fault conditions within the FIM 2021 can comprise failures in the ethernet physical layer, microprocessor 301, FF controller 304 and the MAU 305. These types of internal failures can be ascertained through use of diagnostic firmware run by the FF controller 304. However, there does not exist any technique or mechanism known to a person skilled in the art, to ascertain a fault in the transformer 308 of the FIM.

In addition to the hardware disclosed above, the apparatus of the present disclosure includes a programming unit or a field programmable gate array (FPGA) 303, an analog multiplexer 306, an isolation unit 307, a sense resistor 309 and a sensing unit 310. The additional hardware functions to identify faults in the transformer winding of the FIM. It is thereafter, possible to switch entire control to the secondary FIM, without resulting in a live list mismatch and loss of view for the devices 312n connected to the FF communication links of the FIMs.

The microprocessor 301 is communicatively coupled with the FPGA 303. The microprocessor 301 communicates with the FPGA 303 for sending a message to the field devices 312n. The FPGA 303 is connected to the FF Controller 304. The microprocessor 301 in the normal course of operation provides commands and instructions from the control system to the FF controller 304 via the FPGA 303. The FF controller 303 is also communicatively connected to the MAU 305.

The transformer 308 has a transceiver side winding and a bus side winding. The transceiver side winding is connected to the MAU via transceiver side winding inputs 3081 and 3082. The connection of the transceiver side winding inputs 3081, 3082 with the MAU 305 passes through a summation device 311. The MAU 305 is further connected to the multiplexer 306. The multiplexer 306 is connected to the FPGA 303 and is configured to receive signals from the FPGA 303 as inputs. The multiplexer 306 provides signals to the MAU 305 and to the transceiver side winding of the transformer 308. The FPGA 303 is also connected to an isolation circuit 307, for providing diagnostic signals. The output 3071 and 3072 of the isolation unit 307 are connected to bus side winding of the transformer 308. Output 3071 of the isolation unit is connected to bus side winding input 3083 and output 3072 of the isolation unit 307, is connected to bus side winding output 3084. A sense resistor 309 is provided in series to one end of the transceiver side winding of the transformer 308, as illustrated in FIG. 3. A sensing unit 310 is connected in parallel with the sense resistor 309. The sensing unit 310 is connected to the FPGA 303 and provides an input thereto. The hardware in FIG. 3, performs regular communication in fieldbus communication mode. The disclosed hardware is further configured to periodically transmit a diagnostic pulse for fault detection, according to the disclosure.

In the fieldbus communication mode, the FF controller 304 monitors the regular communication which takes place between the control system 301 and the field devices 312n and establishes a communication path between the control system 301 and the field devices 312n. The FF controller 304 receives the communication from the microprocessor 302, and thereafter translates the commands and instructions for foundation fieldbus (FF) communication. In addition to the above, the FF controller 304 is configured to trigger a transmitter enable signal (TXE). The FF controller 304 establishes the communication path by triggering the TXE signal into an "assert" mode. The TXE signal remains in the "assert" mode until the communication between the control system 301 and field devices 312n concludes. Once the communication between the control system 301 and the field devices 312n concludes, the TXE signal is triggered into a "de-assert" mode by the FF Controller 304.

When the TXE signal is triggered into the "assert" mode, the FF controller 304 provides the commands for field devices 312n to the MAU 305. The MAU 305 applies the commands communicated by the FF controller 304, to the transformer 308. In this communication mode, signals are communicated to the field devices 312n via the transformer 308. The current flow in the transformer 308, results in a voltage drop across the sense resistor 309. The voltage developed across the sense resistor 309 is sensed by the sensing unit 310. The sensing unit 310 amplifies the sensed voltage to achieve a sensed value. The sensed value is thereafter compared against a threshold value of voltage in the sensing unit 310. If the sensed value is above a threshold the channel is declared in good condition. The sensed voltage across the sense resistor may drop below the threshold due to an increase in impedance. The increase in impedance could be due to corrosion or other connection anomaly or there may be a hardware fault in the transformer winding.

This increase in impedance results in a decrease in voltage sensed by the sensing unit 310 across the sense resistor 309. Due to various factors the increase in impedance could range above 500 ohms, and as a result the voltage across the sense resistor 309 could drop below the reference voltage of 200 mV. There are various factors which increase impedance, the factors include loss of power supply, open communication links, termination of communication links or hardware faults within the FIM 2021.

In the field bus communication mode, if the sensed voltage is below the threshold for a given period of time, the sensing unit 310 is configured to trigger a "Fault" flag at the FPGA 303. As soon as the FPGA 303 receives the trigger of the "Fault" flag from the sensing unit 310, the FPGA 303 starts monitoring the TXE signal generated by the FF controller 304. The FPGA 303 detects the "assert" mode and "de-assert" mode of the TXE signal. When the TXE signal is in "de-assert" mode, the FPGA 303 generates a diagnostics pulse ($D_P$) to determine whether the "Fault" flag was set due to real hardware fault in the transformer 308 or under the influence of an external condition. The diagnostic pulse ($D_P$) is applied to the multiplexer 306 and the isolation unit 307. The multiplexer 306 interleaves the diagnostics pulse between the fieldbus communication signals.

The multiplexer 306 applies the diagnostic pulse ($D_P$) to the transceiver side winding of the transformer 308, including the sense resistor 309. On the application of a current at the transceiver side winding of the transformer 308, the current flows through the winding. This current produces a voltage drop that is developed across the sense resistor 309. The sensing unit 310 senses the voltage drop developed across the sense resistor 309. In case the sensing unit 310 does not sense a voltage drop across the sense resistor 309 for a predetermined time period, a "Fault Bit" trigger would be registered in the FPGA indicating a fault in the transformer 308. The fault thereafter is communicated to the control system 301 through the microprocessor 302.

The isolation unit 307 applies the diagnostic pulse ($D_P$) to the bus side winding of the transformer 308. The isolation unit 307 is configured to short the bus side winding of the transformer 308, at the application of diagnostic pulse. The shorting of the bus side winding induces a current in the transceiver side winding of the transformer 308. The induced current in the transceiver side winding establishes a voltage drop across the sense resistor 309. The sensing unit 310 senses the voltage drop developed across the sense resistor 309. In case the sensing unit 310 does not sense a voltage drop across the sense resistor 309 for a predetermined time period, a "Fault Bit" trigger would be registered in the FPGA 303 indicating a fault in the transformer 308. The fault thereafter is communicated to the control system 301 through the microprocessor 302.

The diagnostics pulse, ($D_P$), disclosed above comprises a periodic On and a periodic Off pulse. During the On pulse a current for a short duration is transmitted through the multiplexer 306 and the isolation unit 307. Application of the On pulse effects the voltage drop at the sense resistor 309. The sensing unit 310 senses the voltage drop, and this voltage drop is considered as a diagnostic response ($D_R$) at the sensing unit 310. Each diagnostic response ($D_R$) at the sensing unit 310 corresponds to a voltage being sensed at the sense resistor 309. Each diagnostic response coincides with the On pulse, ascertaining thereby that a voltage is being sensed at the sense resistor 309. In the event that the diagnostic response is not received at the sensing unit 310 within a predetermined time of the application of the On pulse, then this indicates a fault in the windings of the transformer 308, which would require the changeover from the primary FIM to the secondary FIM.

In an exemplary embodiment, the diagnostics pulse comprises a 40 ms On and a 200 ms Off pulse. Each diagnostic response ($D_R$) coincides with the 40 ms On pulse, meaning that a voltage would be sensed at the sense resistor 309 for this period. In case if there is some fault in the transformer 308, no current would be transmitted through it. Accordingly, there would not be any diagnostic response corresponding to a 40 ms On pulse. In the case, if no diagnostic response is received at the sensing unit 310 within 1 second, this would indicate that there is a fault in the windings of the transformer 308, and a changeover from the primary FIM to the secondary FIM is required. The duration of the On state and the Off state of the diagnostics pulse, may be altered as per the design requirement.

Figure 4:
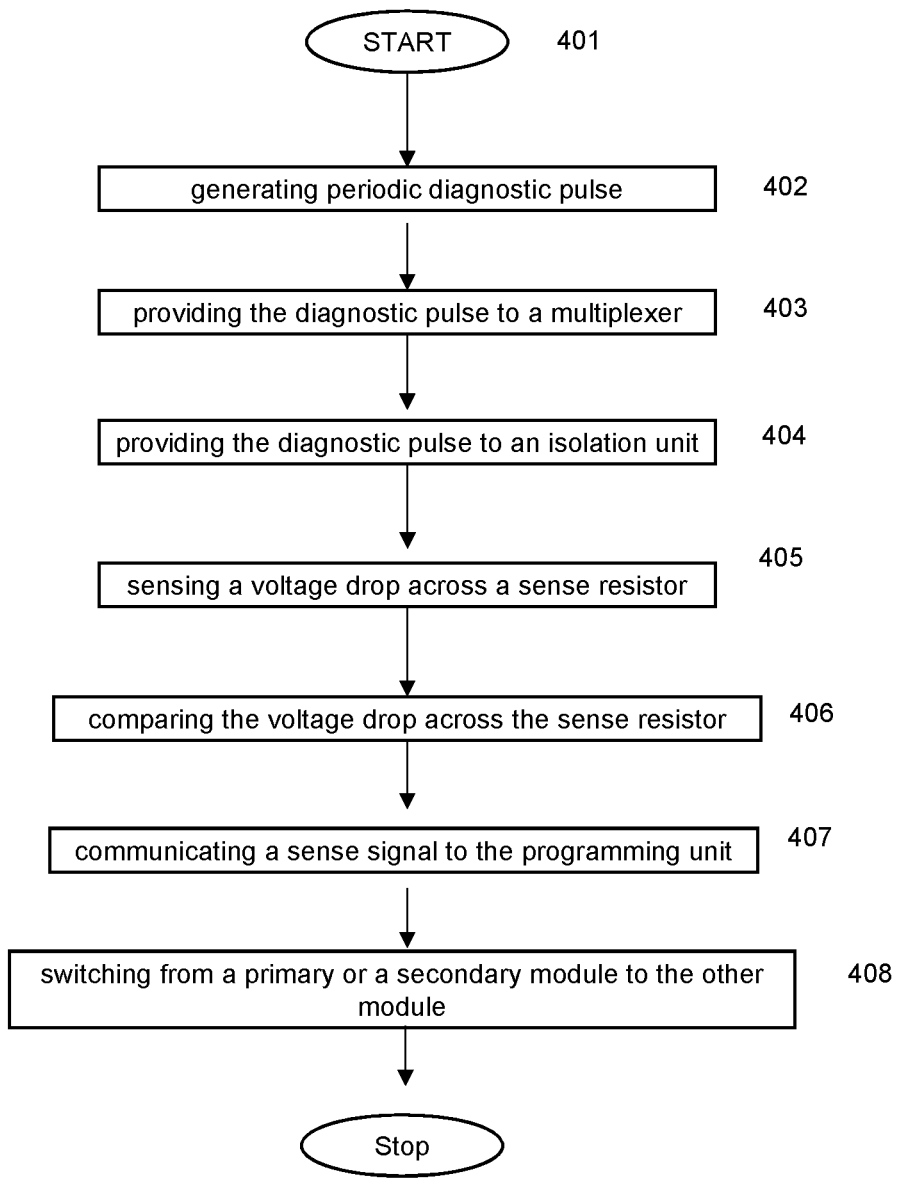
FIG. 4 describes a method according to this disclosure.

FIG. 4 describes an example method for detecting faults in a communication interface, in accordance with the disclosure. At step 401 the FF controller 304 is configured to generate a transmitter enable signal TXE for the fieldbus communication mode. The TXE signal signifies that the FIM is being used for fieldbus communication.

Further at step 401, the FF Controller 303 establishes the communication path by triggering the TXE signal into an "assert" mode. The TXE signal remains in the "assert" mode till the communication between the control system 301 and field devices 312n concludes. Once the communication between the control system 301 and the field devices 312n concludes, the TXE signal is triggered into a "de-assert" mode by the FF controller 303. The FPGA 303 is configured to detect the "assert" mode and "de-assert" mode of the TXE signal. Thus, the process in FIG. 4 has started.

At step 402 the FPGA 303 generates a periodic diagnostic pulse. The periodic diagnostic pulse is generated when the TXE signal is in "de-assert" mode. The FPGA 303 generates the periodic diagnostics pulse to determine whether the "Fault" flag was set due to a hardware fault in the transformer 308 or under influence of external conditions. In an exemplary embodiment, the diagnostics pulse may be in a 40 ms On and 200 ms Off pulse. However, the duration of the On state, and the Off state of the diagnostics pulse, may be altered as per the design requirement.

At step 403, the FPGA 303 provides the periodic diagnostics pulse to a multiplexer 306. The periodic diagnostics pulse is further applied to the transceiver side winding of the transformer 308, by the multiplexer 306. The diagnostics pulse flows through the transceiver side winding, and generates a voltage drop across the sense resistor 309. Simultaneously at step 404, the FPGA 303 provides the periodic diagnostic pulse to an isolation unit 307. The isolation unit 307 applies the periodic diagnostic pulse to the bus side winding of the transformer 308. At the application of the diagnostic pulse to the bus side winding of the transformer 308, the bus side winding becomes short circuited. Short circuiting the bus side winding of the transformer 308 results in a complete loop for current to pass. The bus side winding of the transformer 308 remains shorted, during the duration of the application of the periodic pulse.

At this stage, a current flows in the transceiver side winding and through the sense resistor when both transceiver side winding and bus side winding are intact and non-faulty. At step 405, the sensing unit 310 senses the sense voltage. The current provides a voltage across the sense resistor 309. In case there is a fault in either the transceiver side winding or the bus side winding, no current will flow through the sense resistor 309. The sensed voltage would therefore be negligible or zero. Accordingly, at step 406 the sensed voltage is compared with a reference voltage.

The comparison of the sensed voltage and the reference voltage may be performed by a comparator housed within the sensing unit 310. The comparator compares two voltages and outputs a sense signal indicating which is larger. At step 407, a sense signal is communicated to the FPGA 303 indicating that there is no sensed voltage at the sense resistor 309 for a specified time. The sense signal is received by the FPGA 303 and a "Fault bit" flag is triggered, indicating fault in the transformer 308 of the FIM. At step 408, the control system, periodically check the "Fault bit" flag and initiates a changeover from the primary FIM to the secondary FIM, or vice versa. Simultaneously, the control system breaks the redundancy between the primary FIM and the secondary FIM and raises an alarm to a control system operator that one of the FIMs is faulty. The control system may also raise an alarm indicating that both FIMs are faulty and a replacement of the IOTA module is required.

With this method, it is possible to reliably detect faults in any of the transformer windings of a FIM. This will allow to effectively isolate fault in the FIM hardware from various fault conditions on the fieldbus link external to FIM. With the help of this disclosure, the application firmware can ascertain whether there is a fault in the FIM. Knowledge of fault in the FIM, lowers production cost and provides an inexpensive solution for managing faults in an industrial control system.

SPECIFIC EMBODIMENTS

While the following is described in conjunction with specific embodiments, it will be understood that this description is intended to illustrate and not limit the scope of the preceding description and the appended claims.

A first embodiment of the disclosure is an apparatus for detecting faults in a communication interface, the communication interface connected to a field device and a device bus comprising a controller configured to generate a device bus communication signal, a programming unit communicatively connected to the controller and a controller interface, the programming unit configured to detect faults in the communication interface, and generate periodic diagnostic pulses, a transformer having a first winding connected to the controller interface and a second winding connected to the device bus, a multiplexer connected to the programming unit configured to periodically apply the diagnostic pulses from the programming unit to the first winding, an isolation unit connected to the programming unit configured to periodically apply the diagnostic pulses from the programming unit to the second winding, a sense resistor connected in series to the first winding of the transformer; and a sensing unit connected to the sense resistor and the programming unit, wherein the sensing unit is arranged to determine the voltage across the sense resistor, communicating the sensed voltage to the programming unit.

An embodiment of the disclosure is one, any or all prior embodiments in this paragraph up through the first embodiment in this paragraph, wherein the programming unit is configured to receive the field bus communication signal from the controller. An embodiment of the disclosure is one, any or all of prior embodiments in this paragraph up through the first embodiment in this paragraph, wherein the programming unit is configured to generate the diagnostic pulse based on the field bus communication signal. An embodiment of the disclosure is one, any or all of prior embodiments in this paragraph up through the first embodiment in this paragraph, wherein the programming unit is configured to detect a fault in the transformer based on the signal from sensing unit. An embodiment of the disclosure is one, any or all of prior embodiments in this paragraph up through the first embodiment in this paragraph, wherein the sensing unit comprises of an amplifier and a comparator. An embodiment of the disclosure is one, any or all of prior embodiments in this paragraph up through the first embodiment in this paragraph, wherein the isolation unit comprises of an optocoupler. An embodiment of the disclosure is one, any or all of prior embodiments in this paragraph up through the first embodiment in this paragraph, wherein the controller interface is communicatively connected to the multiplexer and the controller.

A second embodiment of the disclosure is a method for detecting faults in a communication interface, the communication interface connected to a field device and a device bus comprising generating periodic diagnostic pulse by a programing unit, the programming unit communicatively connected to the controller and a controller interface, providing the diagnostic pulse to a multiplexer to periodically apply the diagnostic pulses from the programming unit to a first winding of a transformer, providing the diagnostic pulse to an isolation unit to periodically pass the diagnostic pulses from the programming unit to a second winding of a transformer; sensing a voltage drop across a sense resistor, the sensing unit having an input connected to the sense resistor and an output connected to the programming unit, comparing the voltage drop across the sense resistor with a reference value voltage value, communicating a sense signal based on the comparison to the programming unit, and switching from a primary or a secondary module to the other based on the sense signal.

An embodiment of the disclosure is one, any or all of prior embodiments in this paragraph up through the second embodiment in this paragraph further comprises generating a field bus communication signal by the controller and receives the field bus communication signal at the programming unit. An embodiment of the disclosure is one, any or all of prior embodiments in this paragraph up through the second embodiment in this paragraph, wherein generating periodic diagnostic pulse comprises generate the diagnostic pulse based on the field bus communication signal. An embodiment of the disclosure is one, any or all of prior embodiments in this paragraph up through the second embodiment in this paragraph, wherein switching comprises detecting a fault in the transformer based on the signal from sensing unit. An embodiment of the disclosure is one, any or all of prior embodiments in this paragraph up through the second embodiment in this paragraph, wherein comparing comprises amplifying the voltage drop across the sense resistor. An embodiment of the disclosure is one, any or all of prior embodiments in this paragraph up through the second embodiment in this paragraph, wherein providing the diagnostic pulse to an isolation unit comprises shorting the second winding of the transformer by periodically passing the diagnostic pulse to the second winding of the transformer.

A third embodiment of the disclosure is a system for detecting faults in a communication interface, the communication interface connected to a field device and a device bus comprising generate periodic diagnostic pulse by a programing unit, the programming unit communicatively connected to the controller and a controller interface, provide the diagnostic pulse to a multiplexer to periodically apply the diagnostic pulses from the programming unit to a first winding of a transformer; provide the diagnostic pulse to an isolation unit to periodically pass the diagnostic pulses from the programming unit to a second winding of a transformer; sense a voltage drop across a sense resistor, the sensing unit having an input connected to the sense resistor and an output connected to the programming unit, compare the voltage drop across the sense resistor with a reference value voltage value, communicate a sense signal based on the comparison to the programming unit; and switch from a primary or a secondary module to the other based on the sense signal.

An embodiment of the disclosure is one, any or all of prior embodiments in this paragraph up through the third embodiment in this paragraph, wherein the programming unit is configured to receive the field bus communication signal from the controller. An embodiment of the disclosure is one, any or all of prior embodiments in this paragraph up through the third embodiment in this paragraph, wherein the programming unit is configured to generate the diagnostic pulse based on the field bus communication signal. An embodiment of the disclosure is one, any or all of prior embodiments in this paragraph up through the third embodiment in this paragraph, wherein the programming unit is configured to detect a fault in the transformer based on the signal from sensing unit. An embodiment of the disclosure is one, any or all of prior embodiments in this paragraph up through the third embodiment in this paragraph, wherein the sensing unit comprises of an amplifier and a comparator. An embodiment of the disclosure is one, any or all of prior embodiments in this paragraph up through the third embodiment in this paragraph, wherein the isolation unit comprises of an optocoupler. An embodiment of the disclosure is one, any or all of prior embodiments in this paragraph up through the third embodiment in this paragraph, wherein the controller interface is communicatively connected to the multiplexer and the controller. An embodiment of the disclosure is one, any or all of prior embodiments in this paragraph up through the third embodiment in this paragraph, wherein the isolation unit shorts the second winding of the transformer by periodically passing the diagnostic pulse to the second winding of the transformer.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or.

The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware or a combination of hardware and software/firmware. The functionality associated with any controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

The invention claimed is:

1. An apparatus for detecting faults in a communication interface, the communication interface connected to a field device and a device bus, the apparatus comprising:
   a) a controller configured to generate a device bus communication signal;
   b) a programming unit communicatively connected to the controller and a controller interface, the programming unit configured to:
      a. detect faults in the communication interface; and
      b. generate periodic diagnostic pulses;
   c) a transformer having a first winding connected to the controller interface and a second winding connected to the device bus;
   d) a multiplexer connected to the programming unit configured to periodically apply the diagnostic pulses from the programming unit to the first winding;
   e) an isolation unit connected to the programming unit configured to periodically apply the diagnostic pulses from the programming unit to the second winding,
   f) a sense resistor connected in series to the first winding of the transformer; and
   g) a sensing unit connected to the sense resistor and the programming unit, wherein the sensing unit is arranged to determine a voltage across the sense resistor, communicating the sensed voltage to the programming unit.

2. The apparatus of claim 1, wherein the programming unit is configured to:
   receive a field bus communication signal from the controller.

3. The apparatus of claim 1, wherein the programming unit is configured to:
   generate a diagnostic pulse based on a field bus communication signal.

4. The apparatus of claim 1, wherein the programming unit is configured to:
   detect a fault in the transformer based on a signal from sensing unit.

5. The apparatus of claim 1, wherein the sensing unit comprises an amplifier and a comparator.

6. The apparatus of claim 1, wherein the isolation unit comprises an optocoupler.

7. The apparatus of claim 1, wherein the controller interface is communicatively connected to the multiplexer and the controller.

8. A method for detecting faults in a communication interface, the communication interface connected to a field device and a device bus, the method comprising:
   a) generating periodic diagnostic pulse by a programing unit, the programming unit communicatively connected to a controller and a controller interface,
   b) providing the diagnostic pulse to a multiplexer to periodically apply the diagnostic pulse from the programming unit to a first winding of a transformer;
   c) providing the diagnostic pulse to an isolation unit to periodically pass the diagnostic pulse from the programming unit to a second winding of the transformer;
   d) sensing a voltage drop across a sense resistor, a sensing unit having an input connected to the sense resistor and an output connected to the programming unit;
   e) comparing the voltage drop across the sense resistor with a reference value voltage value;
   f) communicating a sense signal based on the comparison to the programming unit; and
   g) switching from one of a primary or a secondary module to other of the one of the primary or the secondary module, based on the sense signal.

9. The method of claim 8 further comprises:
   generating a field bus communication signal by the controller; and
   receiving the field bus communication signal at the programming unit.

10. The method of claim 9, wherein generating the periodic diagnostic pulse comprises:
    generating the diagnostic pulse based on the field bus communication signal.

11. The method of claim 8, wherein the switching comprises:
    detecting a fault in the transformer based on a signal from sensing unit.

12. The method of claim 8, wherein the comparing comprises:
    amplifying the voltage drop across the sense resistor.

13. The method of claim 8, wherein providing the diagnostic pulse to an isolation unit comprises:
    shorting the second winding of the transformer by periodically passing the diagnostic pulse to the second winding of the transformer.

14. A system for detecting faults in a communication interface, the communication interface connected to a field device and a device bus, the system comprising:
    at least a programming unit configured to:
    a) generate periodic diagnostic pulse by the programing unit, the programming unit communicatively connected to a controller and a controller interface,
    b) provide the diagnostic pulse to a multiplexer to periodically apply the diagnostic pulse from the programming unit to a first winding of a transformer; and
    c) provide the diagnostic pulse to an isolation unit to periodically pass the diagnostic pulse from the programming unit to a second winding of the transformer; and
    at least a sensing unit configured to:
    d) sense a voltage drop across a sense resistor, the sensing unit having an input connected to the sense resistor and an output connected to the programming unit;
    e) compare the voltage drop across the sense resistor with a reference value voltage value;
    f) communicate a sense signal based on the comparison to the programming unit; and
    g) switch from one of a primary or a secondary module to other of the one of the primary or the secondary module, based on the sense signal.

15. The system of claim 14, wherein the programming unit is configured to:
    receive a field bus communication signal from the controller and generate the diagnostic pulse based on the field bus communication signal.

16. The system of claim 14, wherein the programming unit is configured to:
    detect a fault in the transformer based on a signal from sensing unit.

17. The system of claim 14, wherein the sensing unit comprises of an amplifier and a comparator.

18. The system of claim 14, wherein the isolation unit comprises of an optocoupler.

19. The system of claim 14, wherein the controller interface is communicatively connected to the multiplexer and the controller.

20. The system of claim 14, wherein the isolation unit:
    shorts the second winding of the transformer by periodically passing the diagnostic pulse to the second winding of the transformer.

* * * * *